(12) United States Patent
Richards et al.

(10) Patent No.: US 12,208,969 B2
(45) Date of Patent: Jan. 28, 2025

(54) DEVICE FOR MANIPULATING MEAT PIECES AND METHODS THEREOF

(71) Applicant: F.R. Drake Company, Waynesboro, VA (US)

(72) Inventors: Andre G. Richards, Charlottesville, VA (US); Benjamin Oslund, Rockingham, VA (US); Maksim Kirichun, Bridgewater, VA (US)

(73) Assignee: F.R. Drake Company, Waynesboro, VA (US)

( * ) Notice: Subject to any disclaimer, the term of this patent is extended or adjusted under 35 U.S.C. 154(b) by 247 days.

(21) Appl. No.: 17/990,909

(22) Filed: Nov. 21, 2022

(65) Prior Publication Data

US 2023/0166921 A1 Jun. 1, 2023

Related U.S. Application Data

(60) Provisional application No. 63/343,722, filed on May 19, 2022, provisional application No. 63/284,749, filed on Dec. 1, 2021.

(51) Int. Cl.
*B65G 47/14* (2006.01)
*B65G 43/08* (2006.01)
(Continued)

(52) U.S. Cl.
CPC ......... *B65G 47/1407* (2013.01); *B65G 43/08* (2013.01); *B65G 47/68* (2013.01);
(Continued)

(58) Field of Classification Search
CPC .... B65G 47/68; B65G 47/1407; B65G 47/82; B65G 43/08; B65G 2203/0208;
(Continued)

(56) References Cited

U.S. PATENT DOCUMENTS 3,259,225 A * 7/1966 Lehde .................... A01D 33/00
198/786
3,797,195 A 3/1974 Brink et al.
(Continued)

FOREIGN PATENT DOCUMENTS

KR 200-316-203 Y1 6/2003

OTHER PUBLICATIONS

Extended European Search Report issued Apr. 4, 2023 in corresponding European Patent Application No. 22209361.9.

*Primary Examiner* — James R Bidwell
(74) *Attorney, Agent, or Firm* — Crowell & Moring LLP

(57) ABSTRACT

The present disclosure is directed to devices for manipulating meat pieces and methods therefore. In one form, a device comprises a chute, a conveyor, a backstop, and a paddle wheel. The chute is configured to hold pieces of a food product, and the conveyor is configured to receive pieces of the food product released from the chute. The first backstop is positioned above the conveyor and comprises a plate that is configured to align pieces of food product received at the conveyor into a single row. The paddle wheel is positioned above the conveyor downstream from the first backstop and is configured to manipulate the single row of pieces of food product traveling along the conveyor and cause only a single layer of pieces of food product to discharge from the conveyor.

16 Claims, 16 Drawing Sheets

(51) Int. Cl.
*B65G 47/68* (2006.01)
*B65G 47/82* (2006.01)

(52) U.S. Cl.
CPC ...... *B65G 47/82* (2013.01); *B65G 2201/0202* (2013.01); *B65G 2203/0208* (2013.01); *B65G 2203/0283* (2013.01); *B65G 2811/095* (2013.01)

(58) Field of Classification Search
CPC ...... B65G 2811/095; B65G 2203/0283; B65G 2201/0202
USPC .................................................. 198/443, 454
See application file for complete search history.

(56) References Cited

U.S. PATENT DOCUMENTS

| | | |
|---|---|---|
| 3,842,569 A | 10/1974 | McClelland et al. |
| 3,946,538 A * | 3/1976 | Lipes ..................... B65B 43/54 53/385.1 |
| 8,678,886 B1 | 3/2014 | Nothum, Jr. |
| 2021/0100258 A1 | 4/2021 | Nothum, Jr. et al. |

* cited by examiner

DEVICE FOR MANIPULATING MEAT PIECES AND METHODS THEREOF

RELATED APPLICATIONS

The present application claims priority to U.S. Provisional Patent Application No. 63/284,749, filed Dec. 1, 2021, and U.S. Provisional Patent Application No. 63/343,722, filed May 19, 2022, the entirety of both of which are hereby incorporated by reference.

FIELD OF THE DISCLOSURE

The present disclosure relates to a device for manipulating pieces of food product to align the pieces of food product into a single row without the pieces of food product overlapping, and to an automatic jam-clearing system for such as a device.

BACKGROUND OF THE DISCLOSURE

A wide variety of processing and scanning equipment are available within a meat processing plant. Some pieces of equipment, such as X-ray scanners, require that pieces of food product entering the equipment are arranged in a single row where the pieces of food product do not overlap, such that there is a gap between two adjacent pieces of food product. Conventionally, a team of employees at a meat processing plant is dedicated to properly arrange the pieces of food product to meet the entry requirement for the equipment. More efficient means are desirable for arranging pieces of food product in meat processing plants into a single row where pieces of food product do not overlap.

SUMMARY OF THE DISCLOSURE

To address the above problem, the present disclosure provides a machine, sometimes known as a Singulator, that has the ability to arrange pieces of food product in one or more rows without pieces of the food product overlapping in a given row.

Additionally, in some implementations of the present disclosure, when such a machine encounters a jam or is overloaded, the machine provides the ability to automatically detect a backup, jam, or overload of an infeed system and to automatically clear the backup, thereby preventing disruptions to a flow in a processing plant.

In one form, the present disclosure provides a device comprising a chute, a conveyor, a first backstop, and a paddle wheel. The chute is configured to receive and hold pieces of a food product and the conveyor is configured to receive pieces of food product released from the chute.

The first backstop is positioned partially above the conveyor and comprises a plate that extends in a direction parallel to a direction of movement of the conveyor. The plate of the first backstop is configured to align pieces of food product received at the conveyor from the chute into a single row.

The paddle wheel is positioned above the conveyor downstream from the first backstop. The paddle wheel is configured to manipulate the single row of pieces of food product traveling along the conveyor and cause only a single layer of pieces of food product to discharge from the conveyor.

In another form, the present disclosure provides a method for operating a food product manipulating device. In the method, pieces of food product released from a chute are slid onto a conveyor.

A plate of a first backstop aligns the pieces of food product from the chute into a single row, where the plate of the first backstop is positioned at least partially above the conveyor and receives the pieces of food product as they slide onto the conveyor. The plate of the first backstop extends in a direction parallel to a direction of movement of the conveyor.

A paddle wheel is rotated above the conveyor in a direction opposite to the direction of movement of the conveyor to cause a single layer of pieces of food aligned by the first backstop to discharge from the conveyor. The paddle wheel is positioned above the conveyor, downstream from the first backstop.

In yet another form, the present disclosure provides a device comprising a conveyor, a chute, a first backstop, a second backstop, and a paddle wheel.

The chute is configured to receive and hold pieces of food product, where the chute comprises a divider configured to oscillate between a first position and a second position. In the first position, the divider is configured to release pieces of food product at a first position of the conveyor, and in the second position, the divider is configured to release pieces of food product at a second position of the conveyor.

The first backstop is positioned partially above the conveyor and comprises a plate that extends in a direction parallel to a direction of movement of the conveyor. The plate of the first backstop is configured to align pieces of food product into a first single row that are received from the chute at the first position of the conveyor.

The second backstop is positioned partially above the conveyor and comprises a plate that extends in the direction parallel to the direction of movement of the conveyor. The plate of the second backstop is configured to align pieces of food product into a second single row that are received from the chute at the second position of the conveyor.

The paddle wheel is positioned above the conveyor downstream from the first backstop and the second backstop. The paddle wheel is configured to manipulate the first single row of pieces of food product to cause a single layer of pieces of food product of the first row to discharge from the conveyer and to manipulate the second single row of pieces of food product to cause a single layer of pieces of food product of the second row to discharge from the conveyor.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the disclosure. The objects and advantages of the disclosure will become apparent from a study of the following specification when viewed in light of the accompanying drawings, in which like elements are given the same or analogous reference numerals. In these drawings.

DETAILED DESCRIPTION

Figure 1:
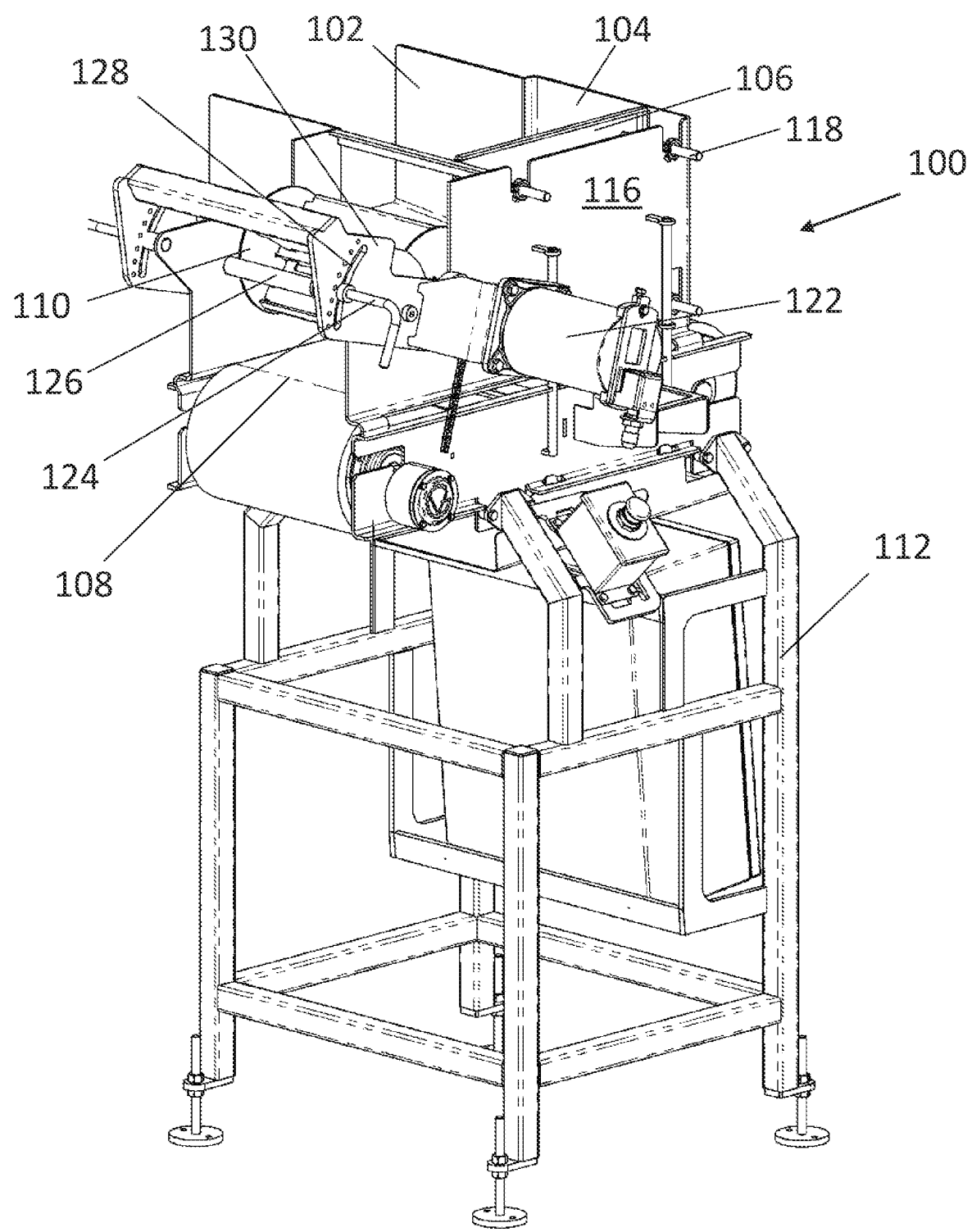
FIG. 1 is a perspective view of one form of a meat manipulating device of the present disclosure.

Reference will now be made in detail to exemplary embodiments and implementations of the disclosure as illustrated in the accompanying drawings, in which like reference characters designate like or corresponding parts throughout the drawings. It should be noted, however, that the disclosure in its broader aspects is not limited to the specific details, representative devices and methods, and illustrative examples shown and described in connection with the exemplary embodiments and implementations.

This description of exemplary embodiments is intended to be read in connection with the accompanying drawings, which are to be considered part of the entire written description. In the description, relative terms such as "inner" and "outer", "inside" and "outside," "horizontal" and "vertical," "front" and "rear," "upper" and "lower," "top" and "bottom" as well as derivatives thereof (e.g., "horizontally," "downwardly," "upwardly," etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows pertinent structures to operate as intended by virtue of that relationship. The term "integral" (or "unitary") relates to a part made as a single part, or a part made of separate components fixedly (i.e., non-moveably) connected together. Additionally, the words "a" and/or "an" as used in the claims mean "at least one" and the word "two" as used in the claims means "at least two". For the purpose of clarity, some technical material that is known in the related art has not been described in detail in order to avoid unnecessarily obscuring the disclosure.

Figure 4:
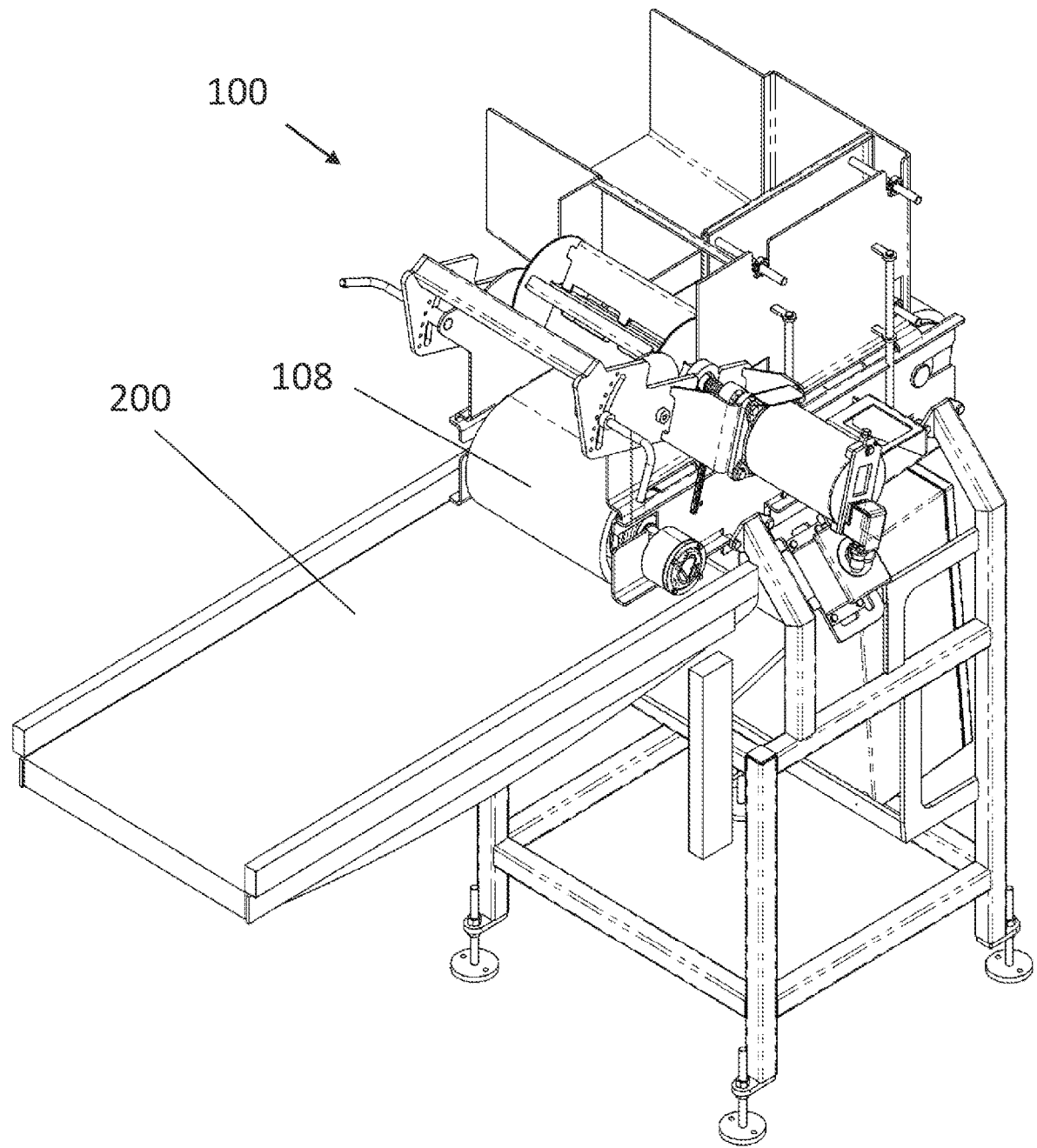
FIG. 4 is a perspective view of the device of FIG. 1 positioned relative to a receiving conveyor.

Referring to the drawings, one form of a meat manipulating device 100 of the present disclosure takes a stream of pieces of meat (also referred to as pieces of food product), aligns the pieces of meat into a single row without the pieces of meat overlapping each other (single layer), and delivers the separated individual pieces of meat onto a receiving conveyor 200 (FIG. 4). Such a meat manipulating device 100 is also known as a Singulator. The meat pieces may be pork, chicken, beef, or other kinds of meat. In some implementations, the meat pieces are of a single kind of meat, e.g., raw chicken breast. The pieces of meat may be primal cuts. As used herein "primal cut" means that the meat has been separated from the carcass and may be further sub-divided into sub-primal or individual cuts of meat. The pieces may be processed at an area of away from the device 100 and delivered to the device 100, e.g., by one or more supply conveyors.

Referring to FIG. 1, the device 100 includes a chute 102 configured to receive a stream of meat pieces, e.g., from a supply conveyor, a hopper 104 having an adjustable backstop 106 for aligning the meat pieces into a single row, a conveyor 108 for carrying the meat away from the hopper 104, and a paddle wheel 110 for ensuring that only a single layer of meat pieces, with no overlapping of the pieces, is aligned on the conveyor 108 as the meat pieces leaves the hopper 104. The device 100 may be supported on a frame 112 to a desired height. The device 100 is preferably manufactured from stainless steel or the like in order to be able to be cleaned as needed when not in use.

The stream of meat pieces is fed into the device 100 via the chute 102. The bottom of the chute 102 includes, or is coupled with, a ramp 114 (see FIGS. 2-3) that is downwardly slanted towards the hopper 104. The ramp 114 allows the meat pieces to slide by gravity towards the hopper 104 and to drop onto the conveyor 108. The stream of meat pieces may be delivered to the machine in a variety of ways, such as by conveyor belt or manually dumped into the chute 102.

The hopper 104 has an open bottom to allow the meat pieces to drop onto the conveyor 108 positioned below the hopper 104. The adjustable backstop 106 is secured to a sidewall 116 (see FIGS. 1-2) of the hopper 104 via posts 118 which protrude through the sidewall 116 and attach thereto with removeable fasteners 120 (see FIG. 2), such as bolts or clamps. In some implementations, the adjustable backstop 106 comprises a flat, metal plate extending in a direction parallel to the sidewall 116, towards the conveyor 108, and terminating about 0.25-1.0 inch above the conveyor 108.

A major surface of the backstop 106 faces the ramp 114. The backstop 106 is positioned parallel to the flow direction of the conveyor 108 such that the plate of the backstop 106 extends in the same direction as the flow direction of the conveyor 108. The backstop 106 is adjustable in a direction perpendicular to the flow direction of the conveyor 108 (the direction of the double ended arrow in FIG. 2). In use, the backstop 106 is adjusted so that the distance d (see FIG. 2)

between the bottom of the ramp 114 and the backstop 106 matches a width of the individual pieces of meat, so that the pieces align in a single row in the flow direction of the conveyor 108. In some implementations, the distance d may be adjusted via the posts 118 and fasteners 120 to ensure that only a single row of meat pieces is aligned in the direction of flow on the conveyor 108.

Figure 3:
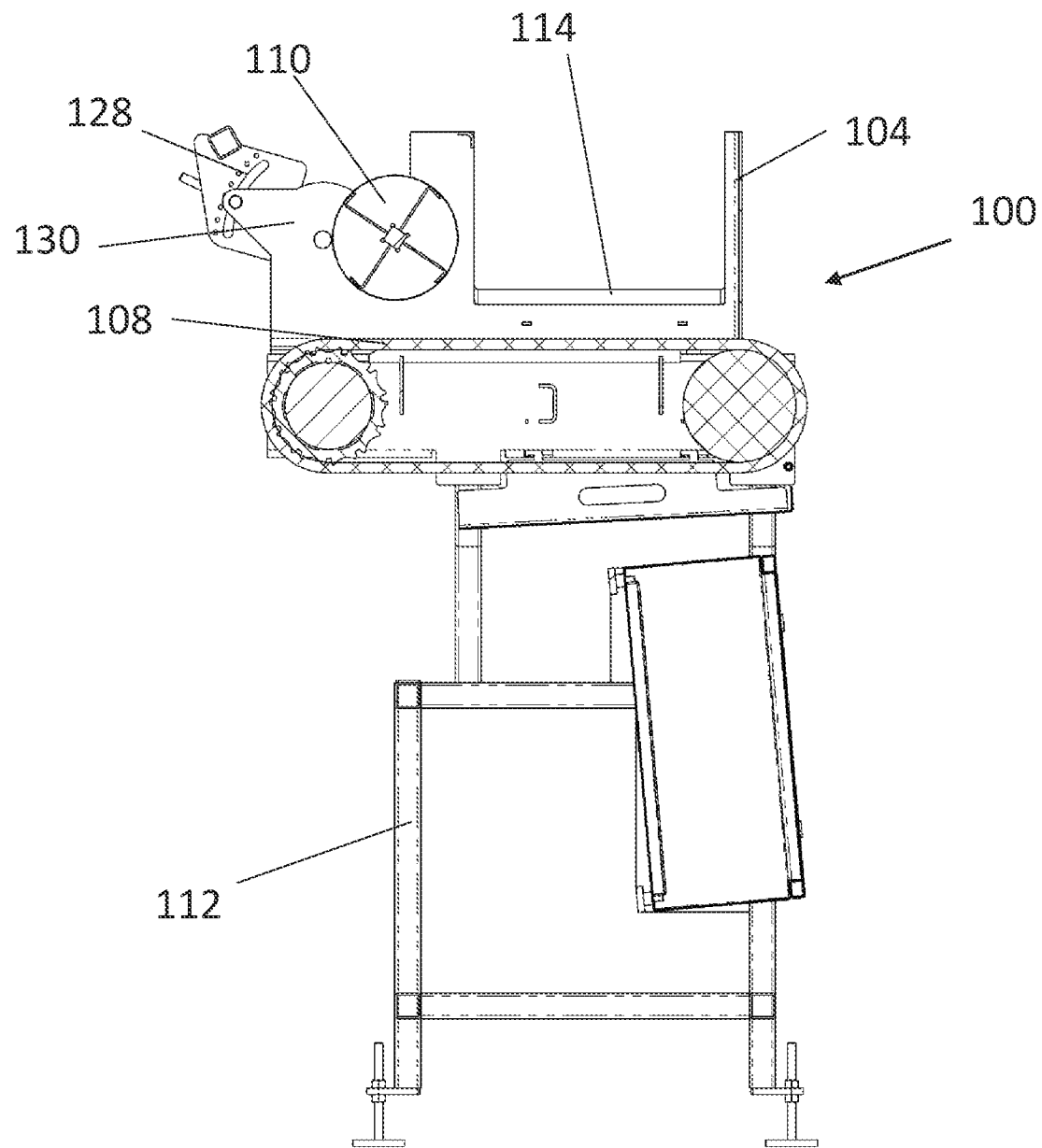
FIG. 3 is a cross-sectional view along line 3-3 of FIG. 2.

Referring to FIG. 3, the conveyor 108 transports the meat pieces away from the hopper 104 as the meat pieces drop onto the conveyor 108 from the chute 102. In some implementations, the conveyor 108 includes a continuous belt rotating on two or more rollers, which is commonly known in the art. The motor driven rollers drive the conveyor 108 and operate through a speed adjustable motor so that the speed of the conveyor 108 can be adjusted as necessary to allow the meat pieces to be removed from chute 102 and located onto conveyor 108.

The paddle wheel 110 is mounted on the device 100 downstream of the hopper 104 and above the conveyor 108. "Downstream" as used herein refers to the transport direction of the conveyor 108. The paddle wheel 110 is configured to ensure that only a single layer of the meat pieces is discharged from the conveyor 108, i.e., the meat pieces do not overlap. The paddle wheel 110 is driven by a motor 122 which rotates the paddle wheel 110 in a direction opposite to the transport direction of the conveyor 108. In that position, if the meat pieces overlap (stacked one on top of the other) on the conveyor 108 as they pass the paddle wheel 110, the paddles 126 push the top pieces off of the bottom most pieces so that only one layer of the pieces are on the conveyor 108 downstream of the paddle wheel 110. While four (4) paddles 126 are illustrated in FIG. 3, a greater or fewer number of paddles may be sued.

Figure 2:
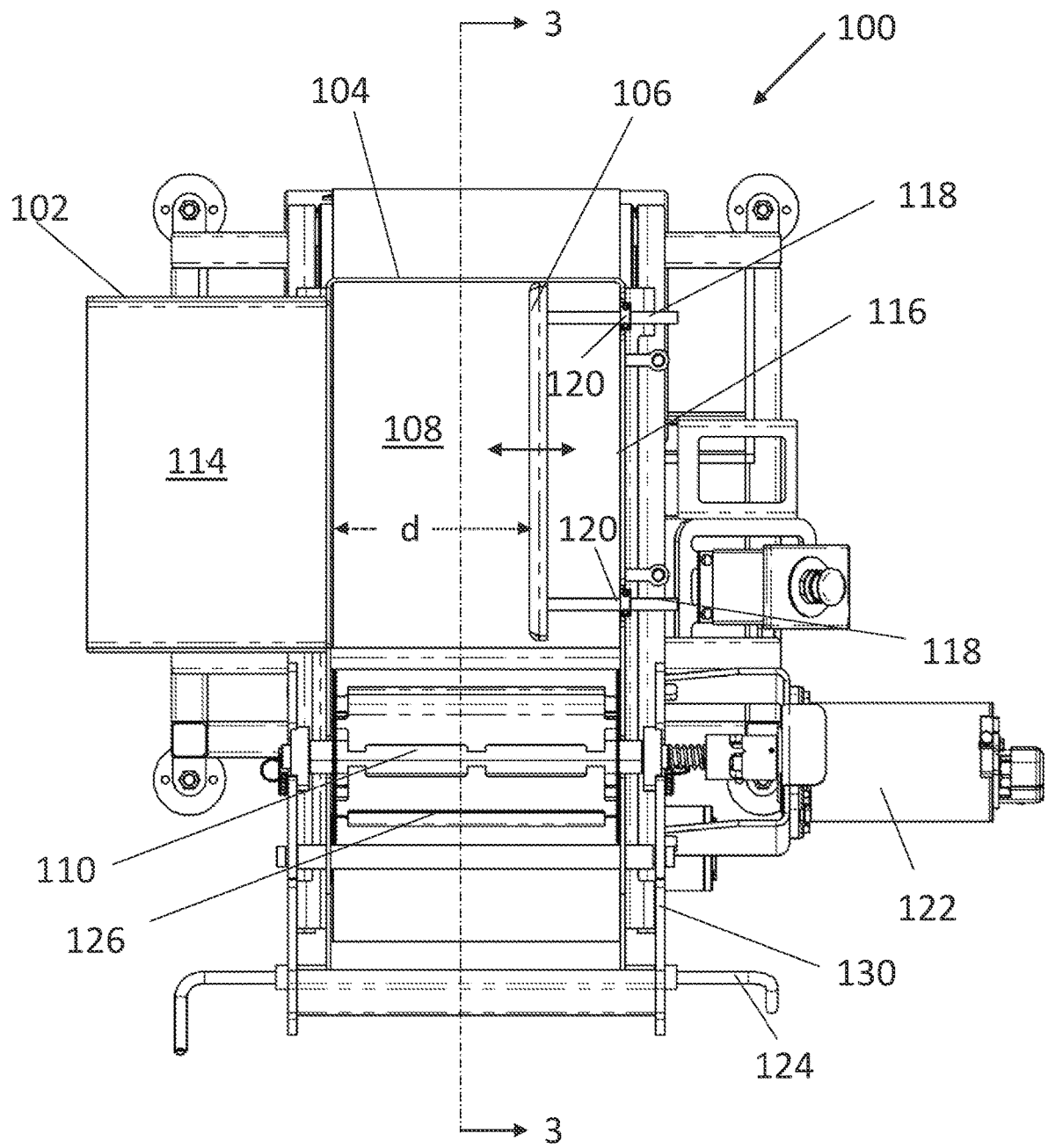
FIG. 2 is a top view of the device of FIG. 1.

The paddle wheel 110 is adjustable toward (downwardly) or away (upwardly) from the conveyor 108 to match the thickness of the meat pieces to ensure that only a single layer of meat pieces is positioned on the conveyor 108. For thicker meat pieces, the paddle wheel 110 is adjusted upwardly; and for thinner pieces, the paddle wheel 110 is adjusted upwardly. In some implementations, as best shown in FIGS. 1-3, the paddle wheel 110 is adjustable by an adjustable arm 124 extending through an arc-shaped slot in a plate 130. The arm 124 is connected to the paddle wheel 110 and is capable of pivoting the paddle wheel 110 away or toward the conveyor 108. The arm 124 is preferably secured within the slot 128 of the plate 130 by mechanical fasteners.

At the downstream end of the conveyor 108, the meat pieces are aligned in a single row without any overlapping or stacking and are then dropped onto the receiving conveyor 200 (see FIG. 4). The receiving conveyor 200 is positioned below the conveyor 108 and carries the meat pieces away for further processing, such as packaging, inspection (e.g., using X-ray), robot handling, scanning (e.g., for further cutting), or the like. The conveyor 108 operates at a speed lower than the speed of the receiving conveyor 200 to space the meat pieces apart on the receiving conveyor 200. For example, the speed of the conveyor 108 is about 10-20% slower than the speed of the receiving conveyor 200. The speed ratio between the conveyor 108 and the receiving conveyor may vary depending on the size of the meat pieces. The speed of the conveyor 108 is adjusted (slowed) until desired separation between the pieces occurs.

Overall, the stream of meat pieces enters the device 100 at the chute 102 and slides toward the hopper 104 and onto the conveyor 108. The backstop 106 in the hopper 104 is adjusted so that only a single row of meat pieces is aligned on the conveyor 108 as the meat pieces exit the hopper 104. The paddle wheel 110 is located downstream of the hopper 104 and is adjusted to ensure that only a single layer of the meat pieces is aligned on the conveyor 108. As the stream of meat pieces exits the conveyor 108, they are aligned in a single row (by the back stop 106) and in a single layer (by the paddle wheel 110). The meat pieces are then dropped from the conveyor 108 on to the receiving conveyor 200. Because the receiving conveyor 200 operates at a faster speed than the conveyor 108, the meat pieces are spaced apart on the conveyor 200.

Another form of a meat manipulating device (also known as a Singulator) with an automatic jam-clearing system is described below with respect to FIGS. 5-9. Structures and operations of the meat manipulating device 100 of FIGS. 5-9 that are similar to the structures and operations of the meat manipulating device 100 of FIGS. 1-4 are not described again below.

Figure 5:
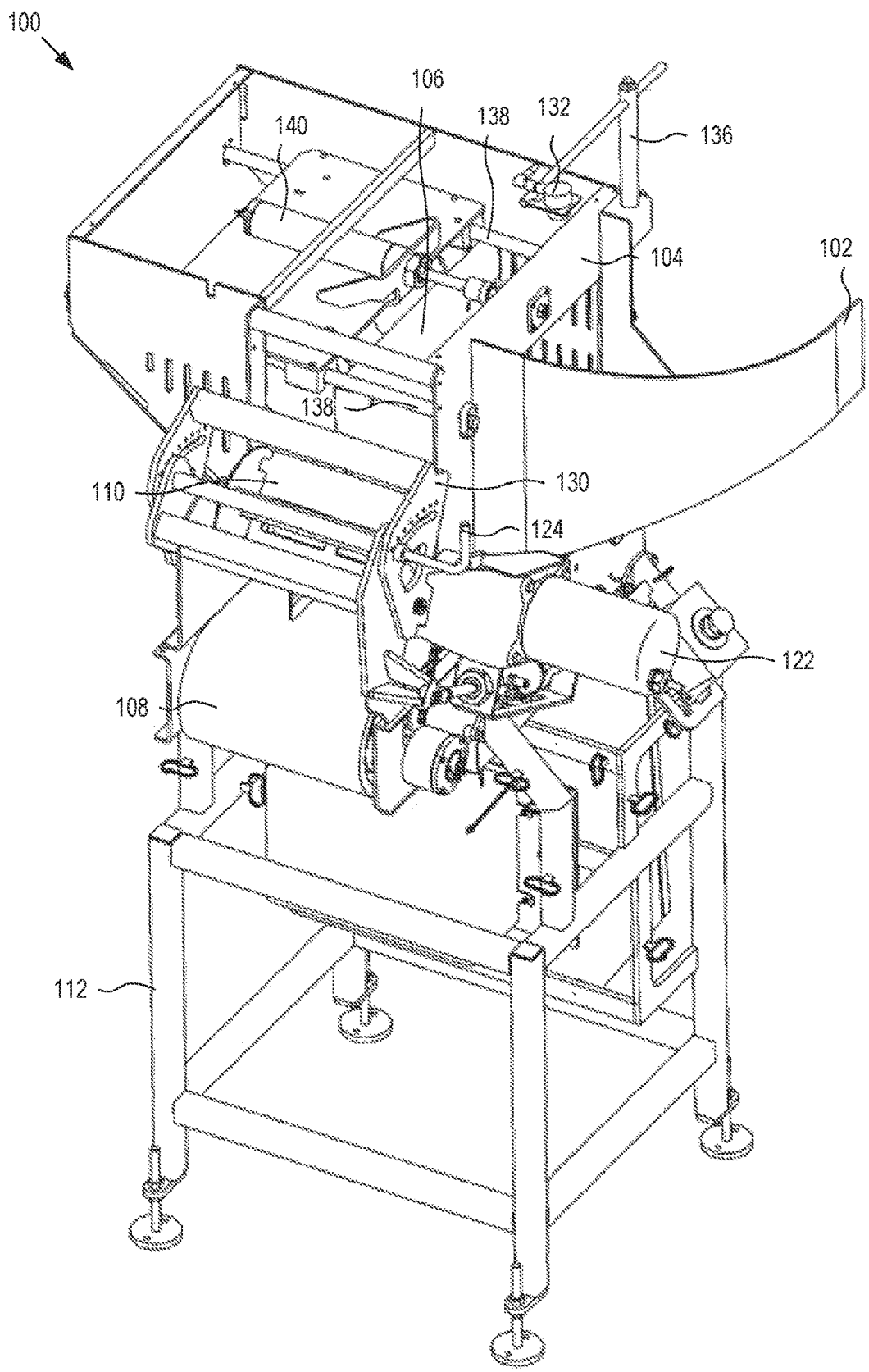
FIG. 5 is a perspective view of one form a meat manipulating device with an automatic jam-clearing system.

FIG. 5 depicts a perspective view of one form a meat manipulating device 100 with an automatic jam-clearing system. As discussed in more detail below, a meat manipulating device 100 with an automatic jam-clearing system is configured to detect a backup to an infeed system of a Singulator using a sensor 132 such as a photo eye sensor that is placed in an adjustable position over the infeed system. Once a backup condition is detected, the Singulator machine will react with a combination of the following (depending on the product specifications and the backup condition detected): 1) Opening up the backstop 106 of the Singulator, thereby exposing more of the main conveyor belt 108 for transporting product, 2) Lifting up the paddle wheel 110 of the Singulator away from the conveyor 108, and/or 3) Increasing the speed of the main conveyor 108 of the Singulator. This condition is called Over Speed Mode ("OSM") where the operation of singulating and separating pieces of food product is suspended in order to clear the jam and/or backup of pieces of food product as quickly as possible.

Figure 9A:
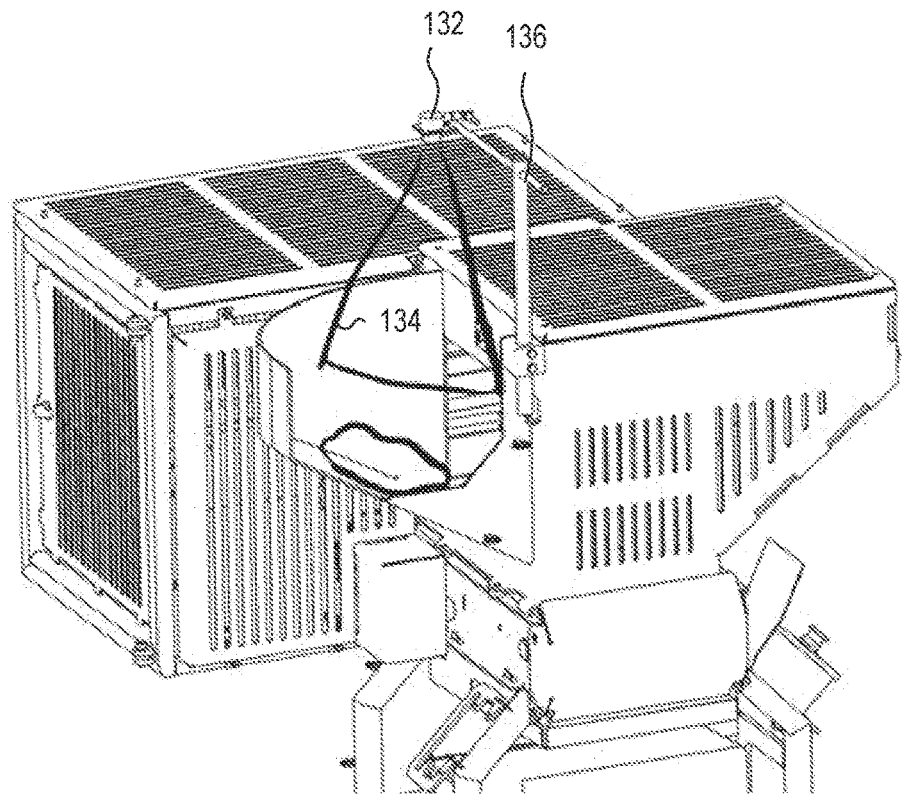
FIGS. 9a and 9b illustrate a first condition where pieces of food product pass under a sensor eye detection range during normal operation and a second condition where a backup or jam is causing pieces of food product to pile up in the chute and entering the detection range of the sensor eye, thereby triggering an over speed mode ("OSM").
Figure 9B:
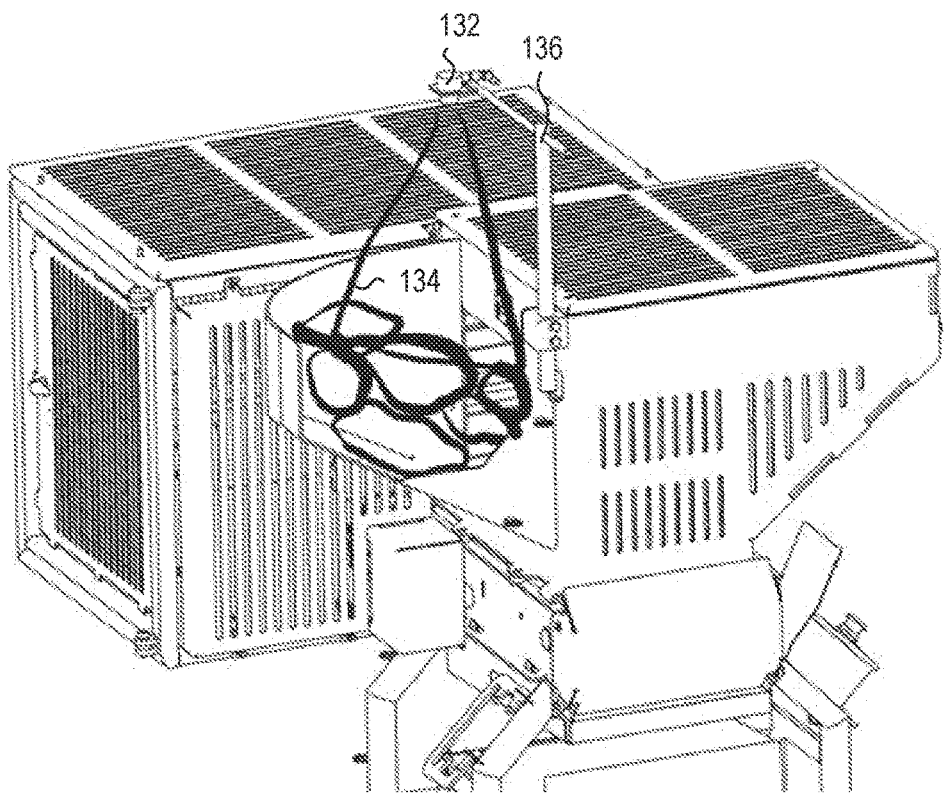

Referring to FIGS. 9a and 9b, the sensor eye 132 operates by detecting when product is within the sensing threshold 134 for a defined period of time. When there is no backup condition, such as during normal operation, the product will either enter the Singulator beneath the threshold 134 of the sensor eye 132 and be undetected or pass through the sensing range quickly enough that the automatic jam-clearing system is not triggered. When there is a product jam, the product will incrementally pile up in the input chute 102. When the pile of pieces of food product becomes large enough that it has crossed the sensing threshold 134 for a duration of a programmed time limit, the automatic jam-clearing system will trigger.

In some implementations the sensor eye 132 is mounted on an adjustable boom 136. Both the physical position and the programmable threshold 134 of the sensor eye 132 can be adjusted to tune the automatic jam-clearing system to trigger for a significant backup while avoiding detection of a momentary jam that will clear on its own.

In some implementations, the automatic jam-clearing system will utilize multiple sensor eyes 132. By using multiple sensor eyes 132 or by tuning multiple parameters of a single programmable sensor eye 132, the automatic jam-clearing system can determine whether the detected backup condition resulted from a product overload or just from a jam under normal infeed conditions. The automatic jam-clearing system can use this differentiation to engage OSM for a short-term pulse to clear a jam or for a longer-term OSM until the product overload has concluded.

Figure 6:
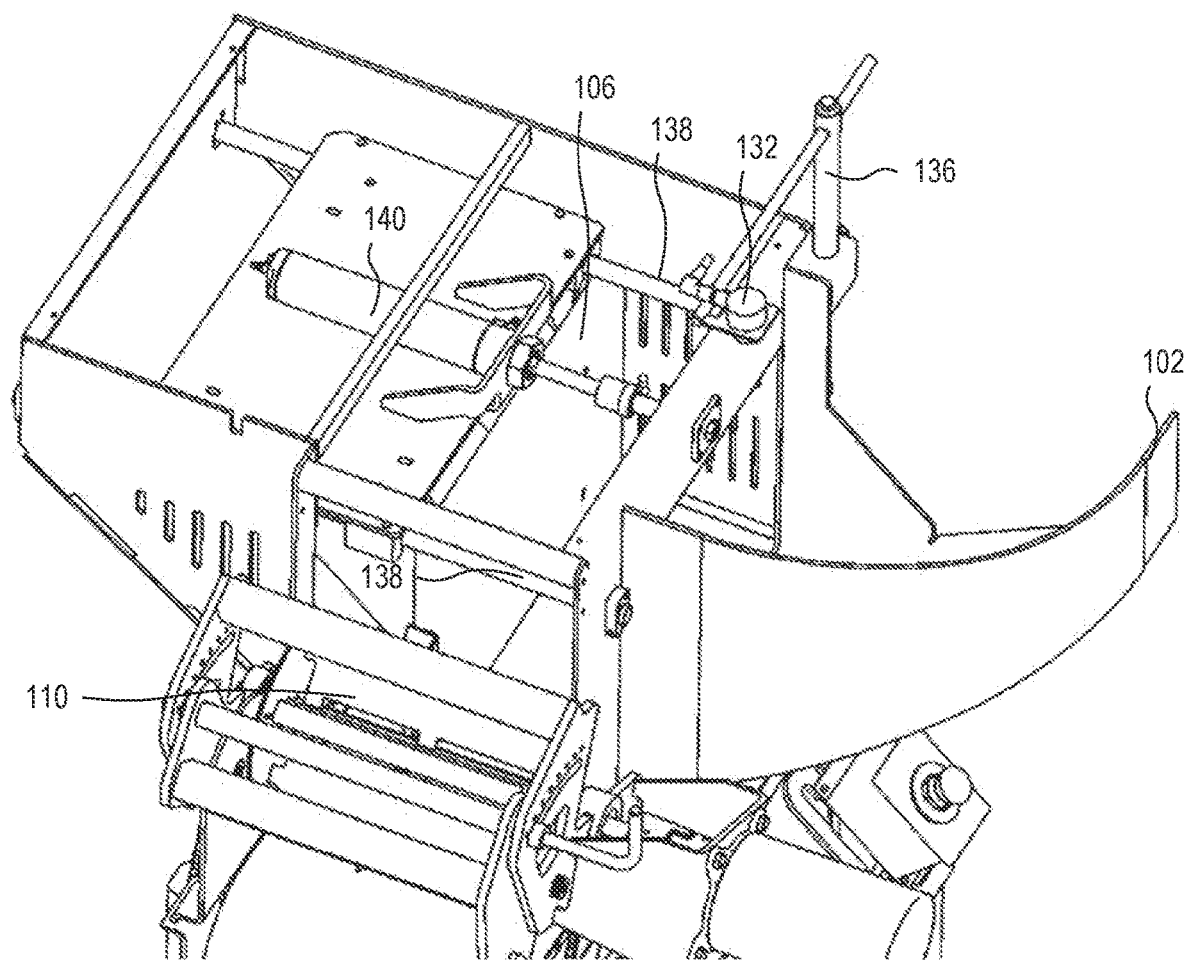
FIG. 6 is a top view of the machine of FIG. 5 illustrating a retractable backstop operation.

Referring to FIGS. 5 and 6, the backstop 106 is mounted on sliding rods 138 and actuated using a linear actuator 140. The linear actuator 140 may be pneumatic, electrical, or any other type of linear actuator.

During normal operation, the backstop 106 is set to an adjustable position that ensures that pieces of food product will exit the machine in single row. However, when the machine is put into OSM, the linear actuator 140 retracts the backstop 106 so that the entire conveyor belt 108 of the Singulator is open for pieces of food product to slide onto. By opening up the backstop 106, it allows more product to flow through the machine 100. When OSM is disengaged, the linear actuator 140 moves the backstop 106 back to its original position.

Figure 7A:
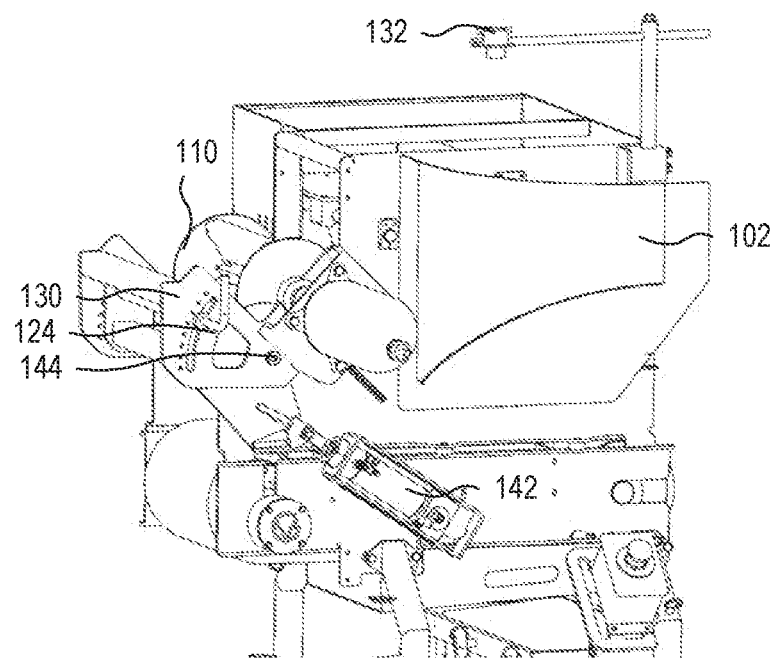
FIGS. 7a and 7b illustrate one form of a paddle wheel raising mechanism in a normal operating position and in a raised position.
Figure 7B:
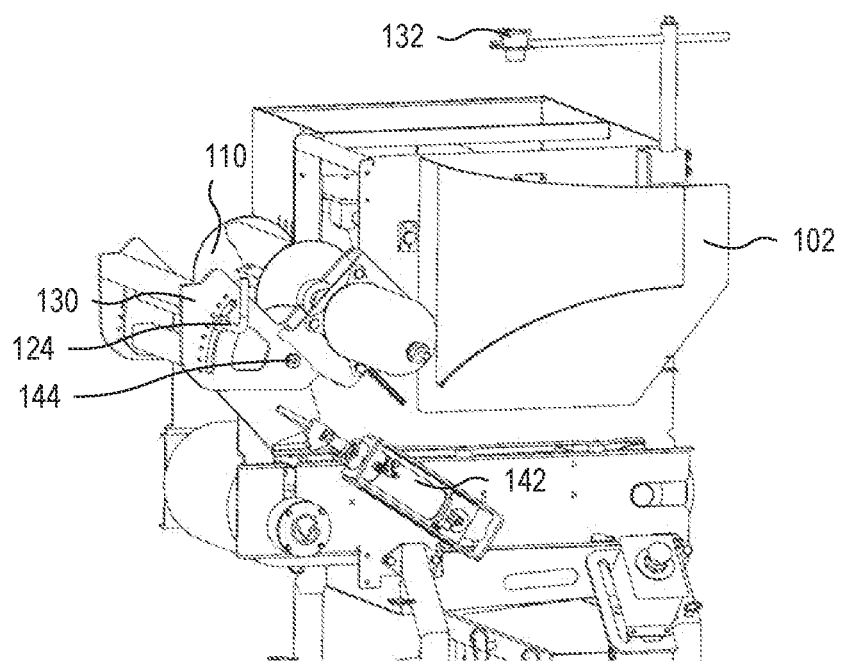

Referring to FIGS. 5, 7a, 7b, and 8a-8d, a vertical position of the paddle wheel 110 (a distance from the paddle wheel 110 to the top of the conveyor) has two components. The first component is an adjustable plate 130 that is raised and lowered manually and locked into place with a threaded lever 124, as shown in FIGS. 7a and 7b. This determines a position of the paddle wheel 110 during normal operation and ensures that only one layer of product exits the machine.

Figure 8A:
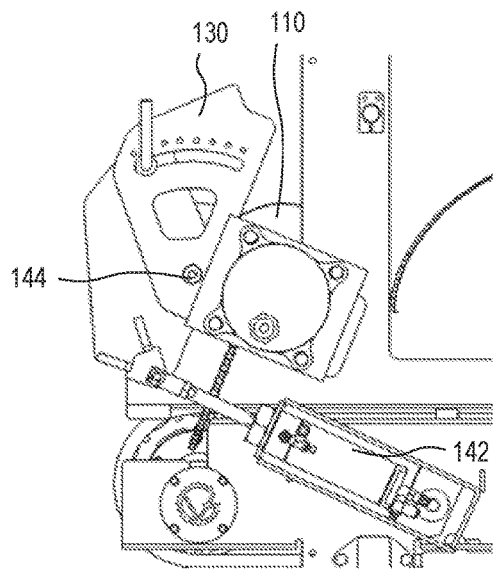
FIGS. 8a, 8b, 8c, and 8d illustrate how an adjusted position of the paddle wheel is maintained when the paddle wheel is raised.
Figure 8B:
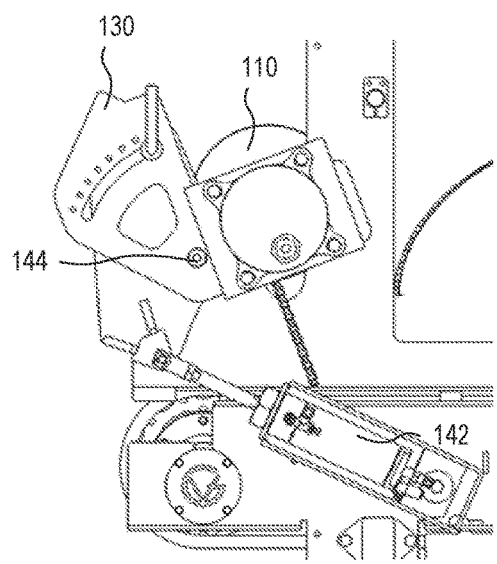
Figure 8C:
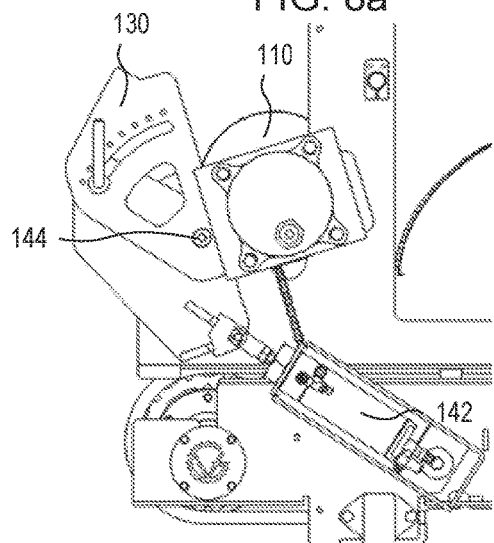
Figure 8D:
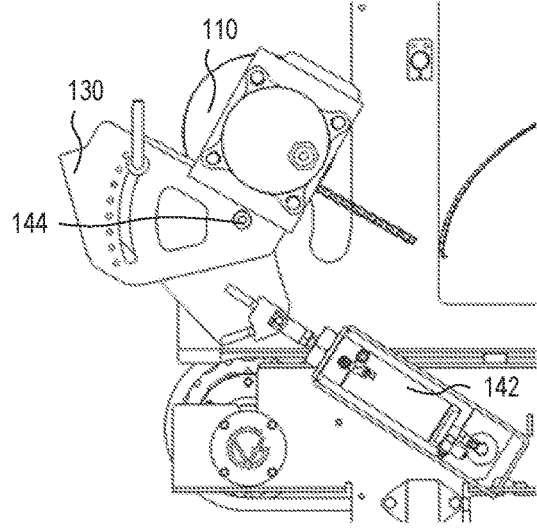

The second component of the vertical position of the paddle wheel 110 is the OSM function. In the second component, a paddle wheel lifting mechanism 142 raises the paddle wheel 110 to a high position so that a large amount of product passes underneath it, as shown in FIG. 8d, when OSM is engaged. Alternatively, the paddle wheel lifting mechanism 142 lowers the paddle wheel 110 to a normal position when the machine returns to normal operation and the OSM is disengaged. The paddle wheel lifting mechanism 142 may be pneumatic, electrical, or any other type of lifting mechanism.

As shown in FIGS. 7a, 7b, and 8a-8d, the manually adjustable portion of the paddle wheel 110 is mounted to portion of the paddle wheel that is raised and lowered depending on whether OSM is engaged. Accordingly, both portions of the paddle wheel 110 pivot about a single point 144. By mounting both components of the paddle wheel 110 this way, the manually adjusted position of the paddle wheel 110 is not lost when OSM is engaged and the paddle wheel lifting mechanism 142 lifts the paddle wheel up and down at the pivot point. The relative angle of the adjusted paddle wheel position relative to the pivoting portion of the OSM remains constant.

In some implementations, a meat manipulating device with an automatic jam-clearing system includes a controller (not shown) that is in communication with the sensor eye 132, the backstop 106, the main conveyor belt 108, and the paddle wheel 110. Accordingly, when the sensor eye 132 detects product within the sensing threshold 134 for a defined period of time, the sensor eye 132 may send a signal such as a backup signal to the controller. In response, the controller may engage OSM and send signals to the linear actuator 140 to open the backstop 106; to the paddle wheel lifting mechanism 142 to lift the paddle wheel 110; and/or to the conveyor belt 108 to increase speed. The controller may be a processor configured to execute instructions stored in a memory, a hardwired controller, or any other type of processor and/or circuitry configured to implement logic for at least the jam-clearing functionality described herein.

In some implementations, when the signal from the sensor eye 132 ceases, the controller disengages OSM and sends signals to the linear actuator 140 to return the backstop 106 to its normal position; to the paddle wheel lifting mechanism 142 to return the paddle wheel 110 to its normal position; and/or to the conveyor belt 108 to return to its normal speed.

In other implementations, the controller may utilize one or more timers to control, based on signals received from the sensor eye 132, how long to stay in an OSM state. In other words, the controller may utilize timers to control how long the linear actuator 140 opens the backstop 106; how long the paddle wheel lifting mechanism 142 lifts the paddle wheel 110; and/or how long the conveyor belt 108 operates at an increase speed. In some implementations, the timing associated with each of the above actions is the same. However, in other implementations, the timing associated with each of the above actions may be individually adjusted such that the timing associated with each of the above actions is not the same.

In some implementation, the controller may be a smart relay. However, in other implementations, other types of controllers may be used such as a processor executing instructions stored in a memory.

Yet another form of a meat manipulating device (also known as a Singulator) 100 that may also include an automatic jam-clearing system is described below with respect to FIGS. 10-15. Structures and operations of the meat manipulating device 100 of FIGS. 10-15 that are similar to the structures and operations of the meat manipulating devices 100 of FIGS. 1-4 and 5-9 are not described again below.

Figure 10:
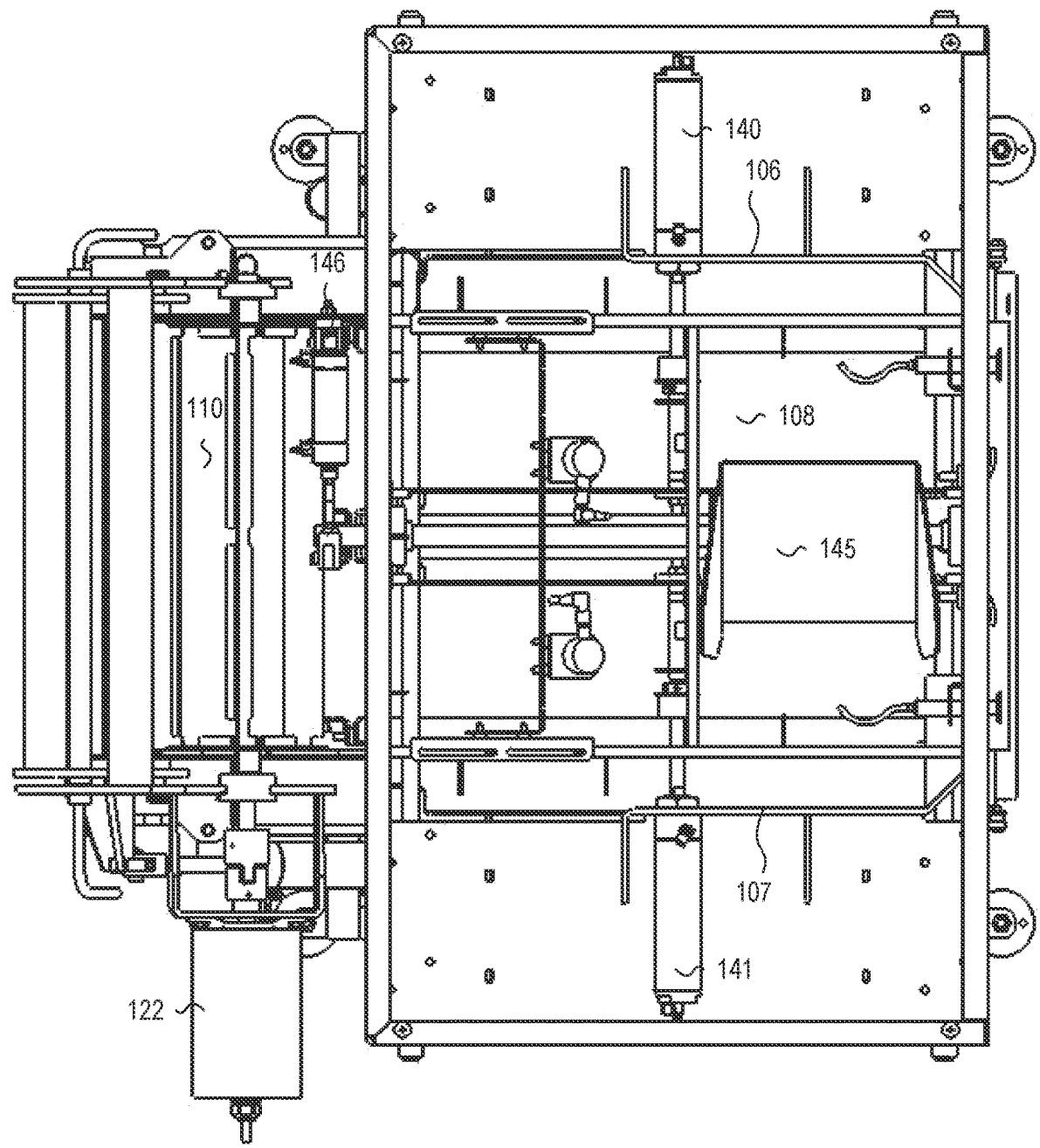
FIG. 10 illustrates a top view of one form of a meat manipulating device that generates two single rows of pieces of food product.
Figure 11:
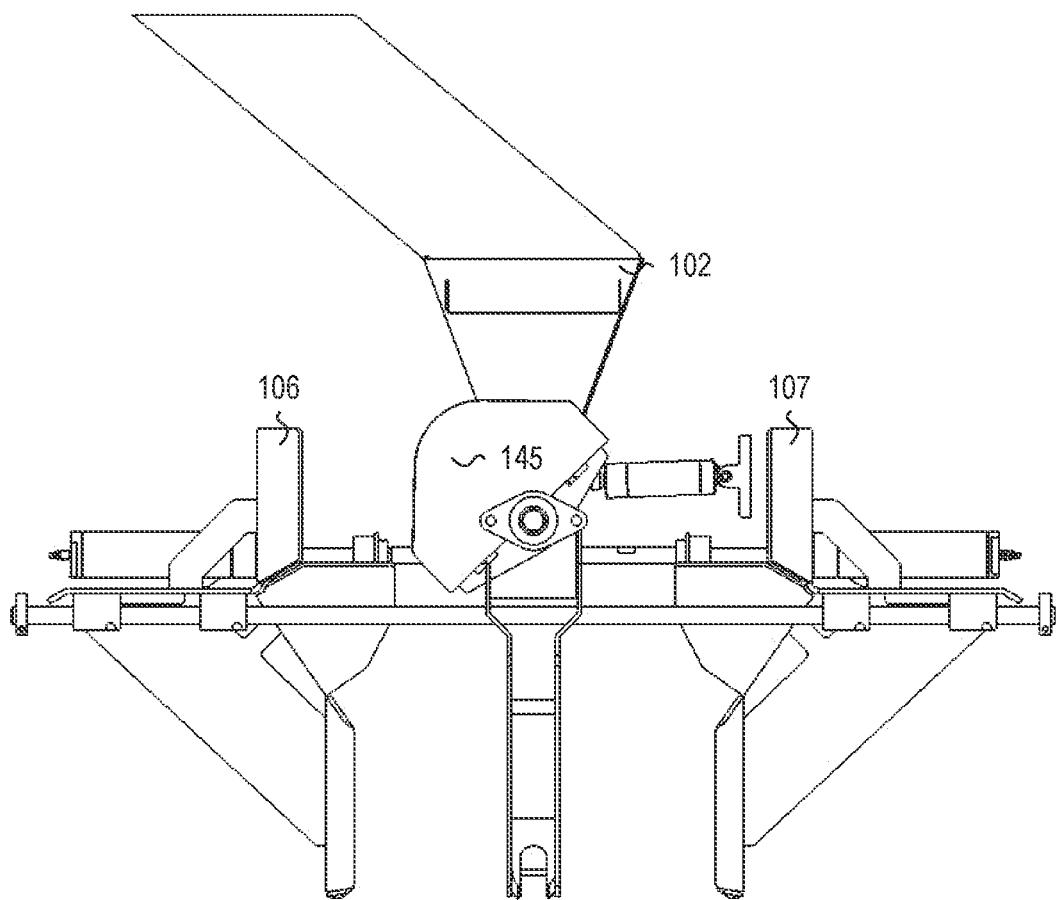
FIG. 11 illustrates a rear view of the divider component of the chute with respect to the first and second backstops of the meat manipulating device of FIG. 10.
Figure 12:
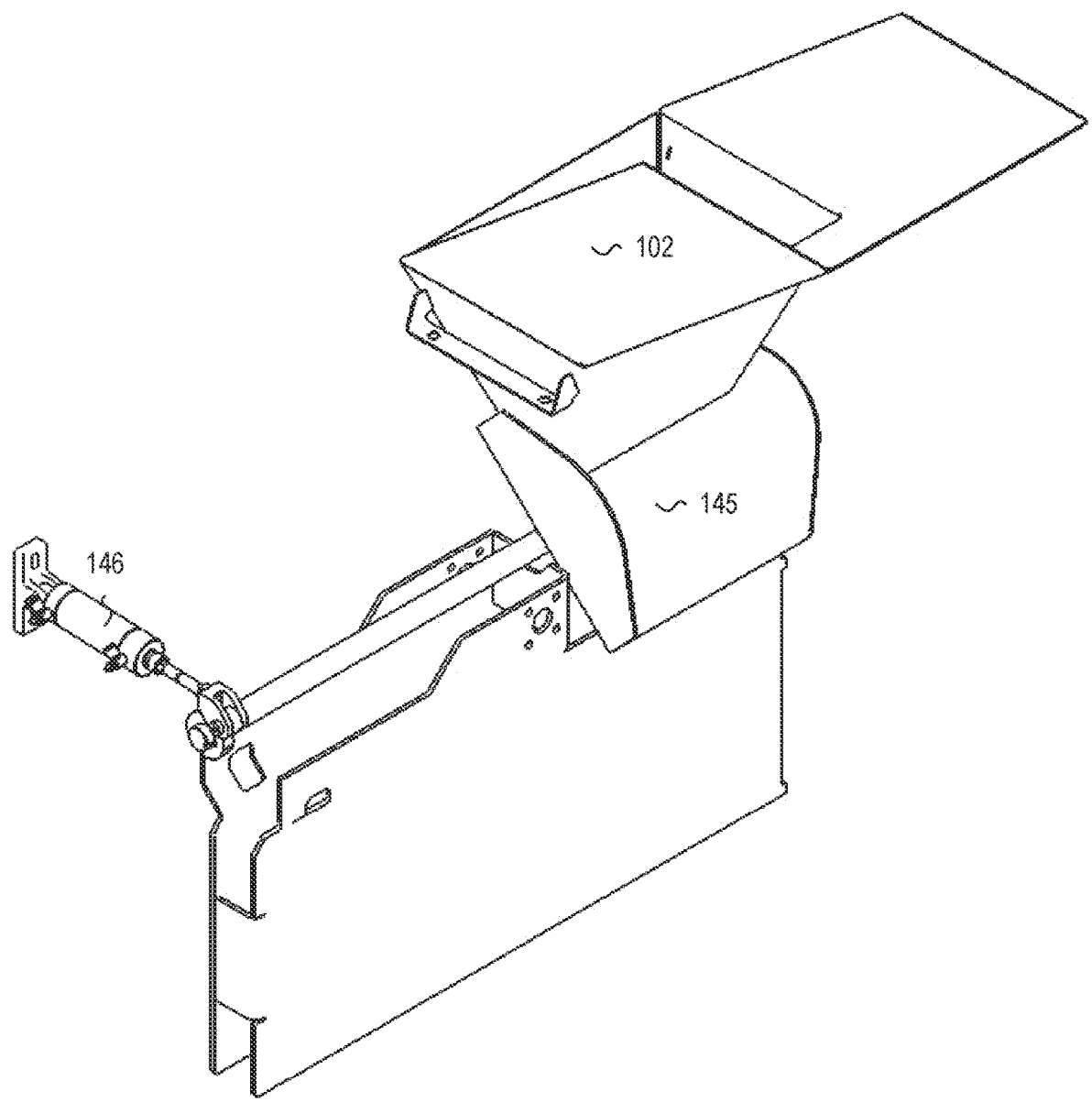
FIG. 12 illustrates a perspective view including a chute and divider components of the meat manipulating device of FIG. 10.
Figure 13:
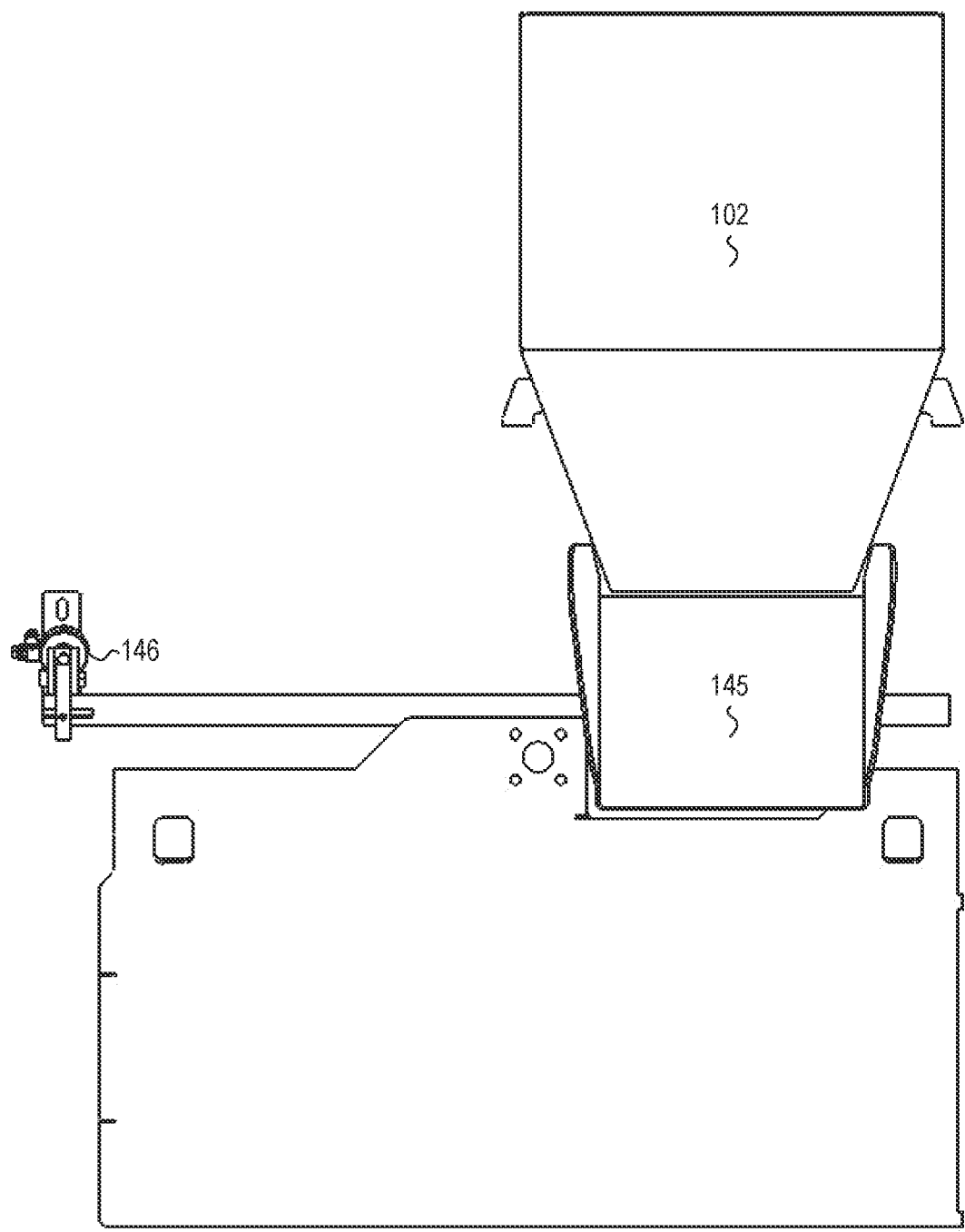
FIG. 13 illustrates a side view including a chute and divider components of the meat manipulating device of FIG. 10.
Figure 14:
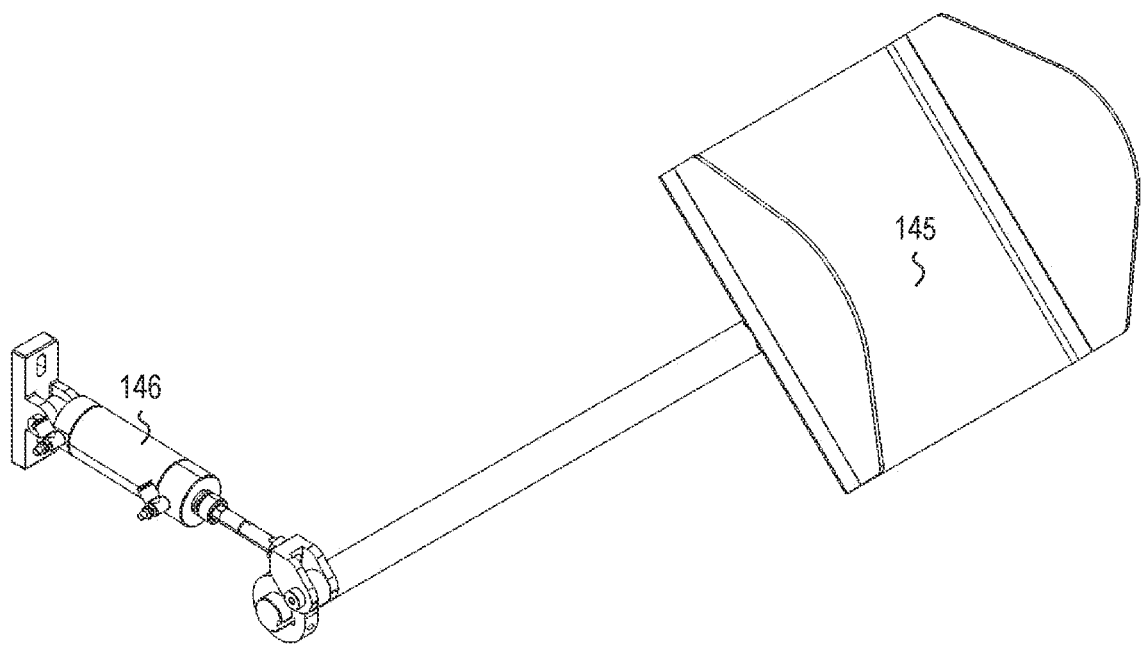
FIG. 14 illustrates a perspective view of a divider and cylinder which oscillates the divider of the meat manipulating device of FIG. 10.
Figure 15:
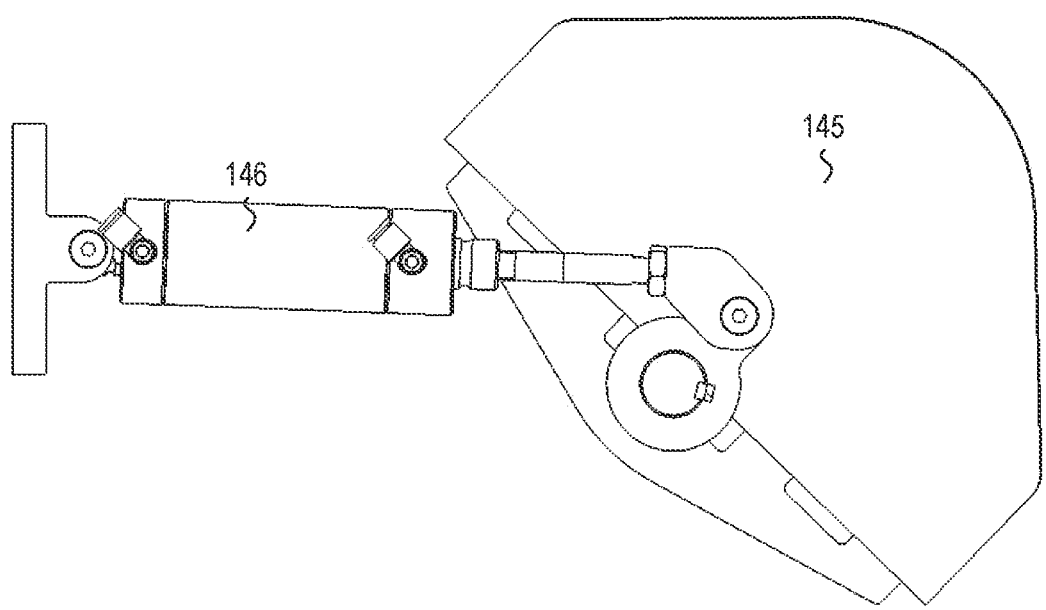
FIG. 15 illustrates a front view of a divider and cylinder which oscillates the divider of the meat manipulating device of FIG. 10.

FIG. 10 depicts a top view of one form of a meat manipulating device 100 that generates two single rows of pieces of food product, where each row of pieces of food product only contains a single layer. In the implementations described below, pieces of food product are fed into the chute 102 of the meat manipulating device 100. The chute 102 includes a divider 145 that oscillates between a first position and a second position to allow pieces of food product to release onto two different positions at the conveyor 108, as described below. In some implementations a cylinder 146 oscillates the divider 145 between the first position and the second position, as shown in FIGS. 11-15.

Referring again to FIG. 10, when the divider 145 is in a first position, the divider 145 creates a ramp to provide a path for pieces of food product released from the chute 102 to slide down the ramp and onto the first position on the conveyor 108. At the first position on the conveyor 108, a plate of the first backstop 106 aligns the pieces of food product into a first row of pieces of food product, similar to the backstop 106 described above.

When the divider 145 is in a second position, the divider 145 creates a ramp to provide a path for pieces of food product released from the chute 102 to slide down the ramp and onto the second position on the conveyor 108. At the second position on the conveyor, a plate of the second backstop 107 aligns the pieces of food product into a second row of pieces of food product.

In some implementations, the divider 145 may oscillate at 1-2 Hz. However, the divider 145 may be set to oscillate at any speed that results in a desired output of two single file rows of pieces of food product.

As the first and second rows of food product travel with the movement of the conveyor 108, the paddle wheel 110 rotates above the conveyor 108 to manipulate each row of food products such that each of the first and second rows of food product is only a single layer of pieces of food product.

In some implementations such as those illustrated in FIG. 10, the meat manipulating device 100 may include one paddle wheel 110 that stretches cross both the first and second rows of food product. However, in other implementations, the meat manipulating device 100 may include two paddle wheels, where a first paddle wheel extends across the first row of pieces of food product and a second paddle wheel extends across the second row of pieces of food product.

Similarly, in some implementations, such as those illustrated in FIG. 10, the meat manipulating device 100 may include one conveyor 108 with first and second positions to receive pieces of food product released from the chute 102 as the divider oscillates between the first and second positions, as described above. However, in other implementations, the meat manipulating device 100 may include two conveyors. The first conveyor is positioned within the meat manipulating device 100 to receive pieces of food product released from the chute 108 when the divider 145 is in the first position and accommodate the first row of pieces of food product. The second conveyor is positioned within the meat manipulating device 100 to receive pieces of food product released from the chute 108 when the divider 145 is in the second position and accommodate the second row of pieces of food product.

Similar to the implementations described above in conjunction with FIGS. 5-9, implementations of a meat manipulating device 100 such as those in FIGS. 10-15 may also include an automatic jam-clearing system.

The meat manipulating device 100 may include one or more sensors 132 such as photo eye sensors positioned over the infeed system. When the one or more photo eye sensors 132 detect a backup, the one or more photo eye sensors 132 send a backup signal to a controller of the meat manipulating device 100. In response, the controller may engage OSM and send signals to a linear actuator 140 to open the first backstop 106 and a linear actuator 141 to open the second backstop 107; to the paddle wheel lifting mechanism 142 to lift the paddle wheel 110; to the conveyor belt 108 to increase speed; and/or to the cylinder 146 to maintain the oscillations for the divider 145 or lock the divider 145 in either the first position or the second position.

One of skill in the art will appreciate that while in some implementations the controller may retract both the first backstop 106 and the second backstop 107 when engaging OSM, in other implementations the controller may selectively retract the first backstop 106 or the second backstop 107 based on information from the one or more eye sensors 132. For example, in some implementations, in addition to one or more eye sensors 132 monitoring for a backup in the chute 102, the meat manipulating device 100 may also include sensors that monitor each of the first and second row of pieces of food product. When a backup of pieces of food product is detected in the first row of pieces of food product, one or more sensors monitoring the first row may send a signal to the controller indicating a backup of the first row. When the controller engages OSM, the controller may open the first backstop 106 to clear the backup in the first row of pieces of food product while maintaining the position of the second backstop 107 where a backup is not present. It will be appreciated that the controller may take similar action when a backup of pieces of food product is detected in the second row of pieces of food product rather than the first row. Further, in implementations such as those described above where the meat manipulating device 100 includes two conveyors rather than a single conveyor 108 and/or two paddle wheels rather than a single paddle wheel 110, the controller may selectively raise one of the paddle wheels and/or selectively increase the speed of one of the conveyors to clear a backup of pieces of food product from one row while maintaining the position of the paddle wheel and/or the speed of the conveyor with respect to the other row where a backup of pieces of food product is not present.

Figure 16:
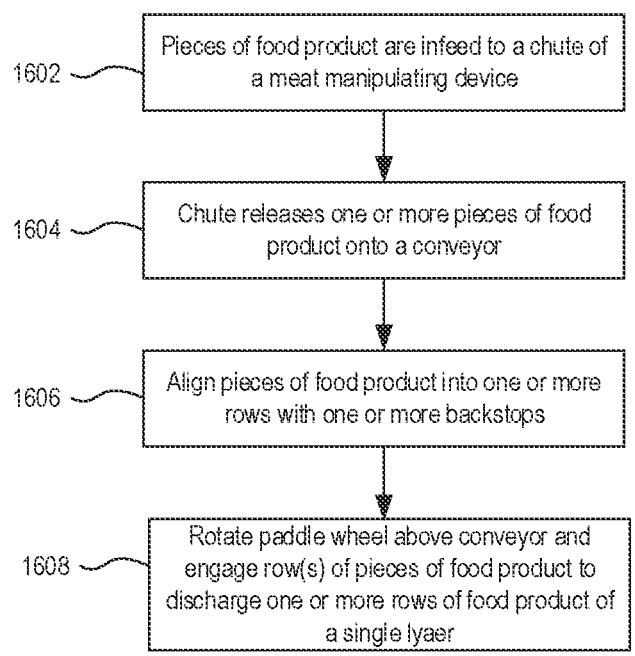
FIG. 16 is a flow chart of one form of a method for manipulating pieces of meat to generate one or more rows of pieces of food product.

FIG. 16 is a flow chart of one form of a method for manipulating pieces of meat to generate one or more rows of pieces of food product. In some implementations, the method described below is performed in a device such as the meat manipulating devices 100 described above in conjunction with FIGS. 1-15.

At step 1602 pieces of food product are infeed to a chute of a meat manipulating device.

At step 1604, the chute releases one or more pieces of food product onto a conveyor. In implementations of meat manipulating devices such as those described above that align pieces of food product into one row of pieces of food product, releasing one or more pieces of food product onto the conveyor may include sliding pieces of food product down a ramp and onto the conveyor.

In implementations of meat manipulating devices such as those described above that align pieces of food product into two rows of pieces of food product, releasing one or more pieces of food product into the conveyor may include oscillating a divider in the chute between a first position and a second position. When the divider of the chute is in a first position, pieces of food product may slide off the divider and onto a first position of the conveyor. When the divider of the chute is in a second position, pieces of food product may slide off the divider and onto a second position of the conveyor.

At step 1606, a plate of a backstop aligns the pieces of food product released from the chute into a row of pieces of food product. In implementations of meat manipulating devices such as those described above that align pieces of food product into one row of pieces of food product, the plate of a backstop is be positioned at the at end of the ramp to engage the pieces of food product as they release from the ramp and fall onto the conveyor. Due the movement of the conveyor and engagement with the plate of the backstop the pieces of food product align into the row.

In implementations of meat manipulating devices such as those described above that align pieces of food product into two rows of pieces of food product, a plate of a first backstop is positioned at the first position of the conveyor to engage pieces of food product as they release from the divider in the first position and fall onto the conveyor. Due the movement of the conveyor and engagement with the plate of the first backstop the pieces of food product align into the first row.

Similarly, a plate of a second backstop is positioned at the second position of the conveyor to engage pieces of food product as they release from the divider in the second position and fall onto the conveyor. Due the movement of the conveyor and engagement with the plate of the second backstop the pieces of food product align into the second row.

At step 1608, a paddle wheel rotates above the conveyor and engages the one or more rows of pieces of food product to push pieces of food product that are at least partially stacked on top of each other. As a result, each row of pieces of food product that discharge from the meat manipulating device are made up of a single layer of pieces of food product.

As described above, the paddle wheel is positioned above the conveyor downstream from the one or more backstops and rotates in an opposite direction to the direction of movement of the conveyor.

Figure 17:
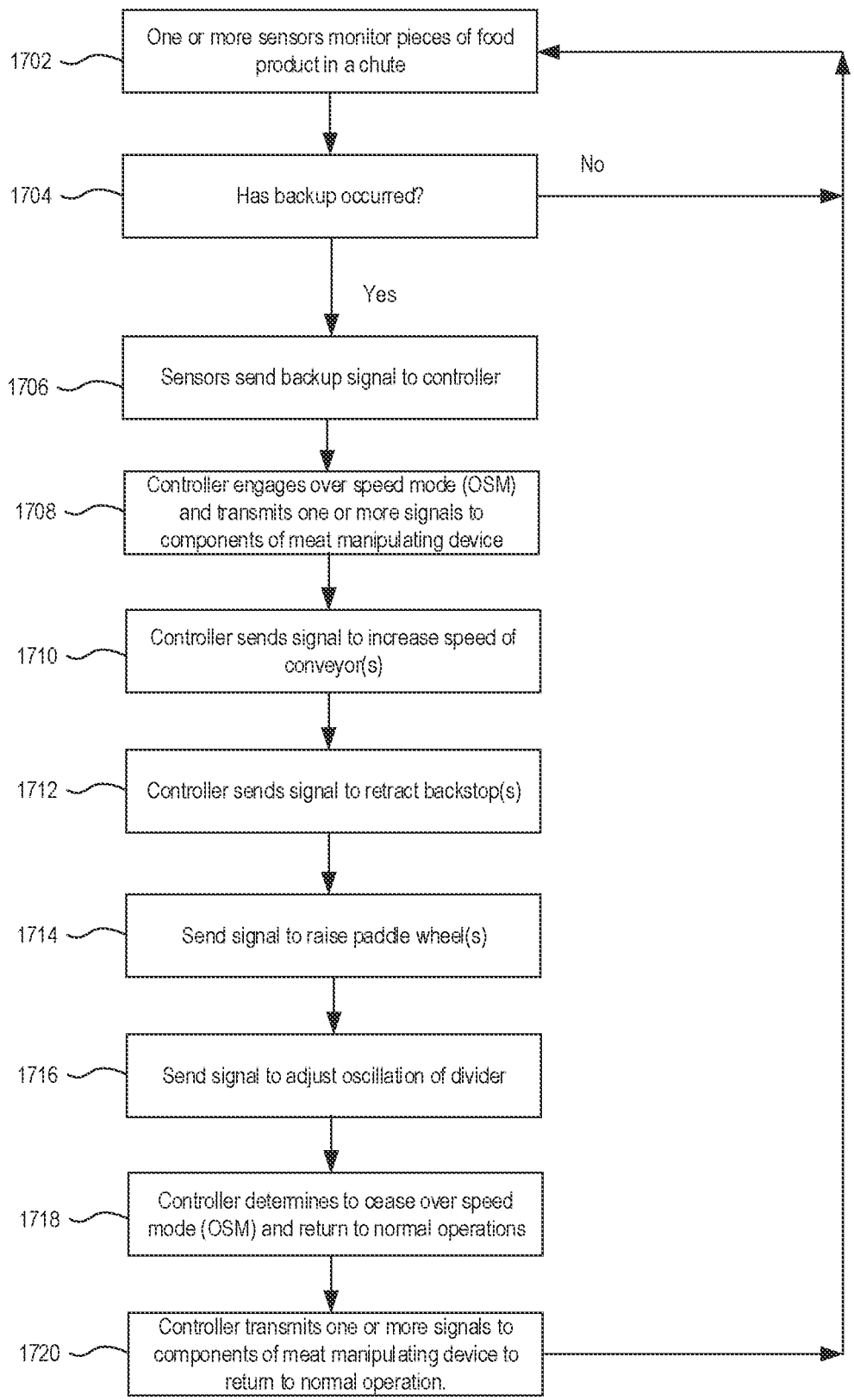
FIG. 17 is a flow chart of one form of a method for performing automatic jam clearing of a device manipulating pieces of meat to generate one or more rows of pieces of food product.

FIG. 17 is a flow chart of one form of a method for performing automatic jam clearing of a device manipulating pieces of meat to generate one or more rows of pieces of food product. In some implementations, the method described below is performed in a device such as the meat manipulating devices 100 described above in conjunction with FIGS. 1-15 and may be performed while a method for manipulating pieces of meat to generate one or more rows of pieces of food product is performed, such as the method described above in conjunction with FIG. 16.

At step 1702 one or more sensors, such photo eye sensors, monitor a level of pieces of food product within a chute of a food manipulating device. It will be appreciated that the one or more sensors may perform this action while the food manipulating device generates one or more rows of pieces of food product.

At step 1704, the one or more sensors determine whether a backup has occurred. In some implementations, the one or more sensors may determine that a backup has occurred when pieces of food product are within a defined range of the one or more sensors for a defined period of time.

When the one or more sensors do not detect a backup at step 1704, the method loops to step 1702 and the one or more sensors continue to monitor for a backup.

When the one or more sensors detect a backup at step 1704, the one or more sensors send a signal to a controller at step 1706 indicating that a backup has occurred in the food manipulating device.

At step 1708, the controller engages an over speed mode (OSM) and sends one or more signals to components of the food manipulating device to clear the backup of pieces of food product.

For example, the controller may send a signal to one or more conveyors to increase their speed at step 1710; the controller may send a signal to one or more backstops to retract at step 1712; the controller may send a signal to one or more paddle wheels to raise their position with respect to the conveyor at step 1714; and/or in implementations including an oscillating divider in a chute, the controller may send a signal to change a frequency of oscillation of the divider or to lock the divider in a first or second position at step 1716.

At step 1718, the controller determines to cease the over speed mode and return to normal operations. In some implementations, the controller may determine to cease the over speed mode and return to normal operations when the signal from the one or more sensors indicating a backup ceases. In other implementations, the controller may determine to cease the over speed mode and return to normal operations when one or more timers expire that the controller utilizes in connection with over speed mode.

At step 1720, the controller may send a signal to one or more components of the food manipulating device to return to normal operations. For example, the controller may send a signal to one or more conveyors to return to a normal operating speed; the controller may send a signal to one or more backstops to return to a normal operating position; the controller may send a signal to one or more paddle wheels to return to a normal operating position; and/or in implementations including an oscillating divider in a chute, the controller may send a signal to the divider to return to normal operations.

The method then loops to step 1702 and the above-recited steps are repeated to continue to monitor for a backup of pieces of food product while the food manipulating device generates one or more rows of pieces of food product.

Devices, and methods for operating devices, are described above in conjunction with FIGS. 1-17 for arranging pieces of food product in to one or more single rows without pieces of the food product overlapping in a given row, and for when such a device encounters a jam or is overload, automatically detecting a backup, jam, or overload of an infeed system and to automatically clear the backup. These devices and methods provide more efficient means for arranging pieces of food product in meat processing plants into a single row where pieces of food product do not overlap, while also having the ability to automatically prevent disruptions to a flow of food product in a processing plant.

Although certain embodiments and implementations of the disclosure have been specifically described herein, it will be apparent to those skilled in the art to which the disclosure pertains that variations and modifications of the various embodiments shown and described herein may be made without departing from the spirit and scope of the disclosure. Accordingly, it is intended that the disclosure be limited only to the extent required by the appended claims and the applicable rules of law.

The invention claimed is:

1. A device, comprising:
  a chute configured to receive and hold pieces of a food product;
  a conveyor configured to receive pieces of the food product released from the chute;
  a first backstop positioned partially above the conveyor, the first backstop comprising a plate that extends in a direction parallel to a direction of movement of the conveyor, wherein the plate of the first backstop is configured to align pieces of food product received at the conveyor from the chute into a single row;
  a paddle wheel positioned above the conveyor downstream from the first backstop, wherein the paddle wheel is configured to manipulate the single row of pieces of food product traveling along the conveyor and cause only a single layer of pieces of food product to discharge from the conveyor, wherein the paddle wheel is adjustable in a downwards direction towards the conveyor or an upwards direction away from the conveyor; and
  a controller configured to adjust:
    a speed of the conveyor;
    a position of the first backstop in a direction perpendicular to the direction of movement of the conveyor; and
    a position of the paddle wheel with respect to the conveyor.

2. The device of claim 1, wherein the chute comprises a ramp slanted downward that is configured to allow pieces of food product to slide from the chute and drop onto the conveyor.

3. The device of claim 2, wherein the face of the first backstop is positioned a distance from an end of the ramp of the chute such that pieces of the food product align in a single row.

4. The device of claim 1, wherein the first backstop is adjustable in a direction perpendicular to the direction of movement of the conveyor.

5. The device of claim 1, wherein the paddle wheel rotates in a direction opposite to the direction of movement of the conveyor.

6. The device of claim 1, further comprising:
  a sensor configured to detect a backup of pieces of food product within the chute and to send a backup signal to the controller upon detection of the backup of pieces of food product;
  wherein upon receipt of the backup signal from the sensor, the controller is configured begin an over speed mode, wherein the controller is configured to at least one of:
    increase the speed of the conveyor;
    retract the first backstop away from the chute; or raise the paddle wheel in an upward direction away from the conveyor.

7. The device of claim 6, wherein upon the backup signal from the sensor ceasing, the controller is configured to end the over speed mode.

8. The device of claim 6, wherein the controller is configured to end the over speed mode after a defined period of time.

9. A device, comprising:
a chute configured to receive and hold pieces of a food product;
a conveyor configured to receive pieces of the food product released from the chute;
a first backstop positioned partially above the conveyor, the first backstop comprising a plate that extends in a direction parallel to a direction of movement of the conveyor, wherein the plate of the first backstop is configured to align pieces of food product received at the conveyor from the chute into a single row; and
a paddle wheel positioned above the conveyor downstream from the first backstop, wherein the paddle wheel is configured to manipulate the single row of pieces of food product traveling along the conveyor and cause only a single layer of pieces of food product to discharge from the conveyor;
wherein the chute comprises an oscillating divider configured to oscillate between a first position and a second position, where in the first position, the oscillating divider acts as a first ramp that provides a path for a piece of food product to slide onto a first portion of the conveyor, and in the second position, the oscillating divider acts as a second ramp that provides a path for a piece of food product to slide onto a second portion of the conveyor;
wherein the device further comprises a second backstop positioned partially above the conveyor, the second backup comprising a plate that extends in a direction parallel to the direction of movement of the conveyor, wherein the plate of the second backstop is configured to align pieces of food product into a single row that are received at the conveyor from the oscillating divider in the second position; and
wherein the plate of the first backstop is configured to align pieces of food product in a single row that are received at the conveyor from the oscillating divider in the first position, where the single row of food product aligned by the first backstop is distinct from the single row of food product aligned by the second backstop.

10. The device of claim 9, wherein the paddle wheel extends across the single row of pieces of food product aligned by the first backstop and the single row of pieces of food product aligned by the second backstop.

11. The device of claim 10, further comprising:
a controller configured to adjust:
a speed of the conveyor;
a position of the first backstop in a direction perpendicular to the direction of movement of the conveyor;
a position of the second backstop in a direction perpendicular to the direction of movement of the conveyor; and
a position of the paddle wheel with respect to the conveyor; and
a sensor configured to detect a backup of pieces of food product within the chute and to send a signal to the controller upon detection of the backup of pieces of food product;

wherein upon receipt of the signal from the sensor, the controller is configured to at least one of:
increase the speed of the conveyor;
retract the first backstop away from the first ramp of the chute;
retract the second backstop away from the second ramp of the chute; or
raise the paddle wheel in an upward direction away from the conveyor.

12. A method for operating a food product manipulating device, comprising:
sliding pieces of food product released from a chute onto a conveyor;
aligning the pieces of food product from the chute into a single row with a plate of a first backstop positioned at least partially above the conveyor and to receive the pieces of food product as they slide onto the conveyor, wherein the plate of the first backstop extends in a direction parallel to a direction of movement of the conveyor; and
rotating a paddle wheel above the conveyor, downstream from the first backstop, in a direction opposite to the direction of movement of the conveyer to cause a single layer of pieces of food product aligned by the first backstop to discharge from the conveyor;
monitoring, with a sensor, a level of pieces of food product within the chute;
upon a determination that the level of pieces of food product within the chute exceeds a threshold, sending a backup signal from the sensor to a controller; and
in response to receiving the backup signal, entering, with the controller, an over speed mode and transmitting one or more signals from the controller to perform at least one of:
increasing a speed of the conveyor;
adjusting a position of the backstop to increase a distance between the ramp and the pate of the backstop; or
raising a position of the paddle wheel in relation to the conveyor.

13. The method of claim 12, further comprising:
ending, with the controller, the over speed mode in response to the backup signal from the sensor ceasing.

14. The method of claim 12, further comprising:
ending, with the controller, the over speed mode after a defined period of time.

15. A method for operating a food product manipulating device, comprising:
sliding pieces of food product released from a chute onto a conveyor;
aligning the pieces of food product from the chute into a single row with a plate of a first backstop positioned at least partially above the conveyor and to receive the pieces of food product as they slide onto the conveyor, wherein the plate of the first backstop extends in a direction parallel to a direction of movement of the conveyor;
rotating a paddle wheel above the conveyor, downstream from the first backstop, in a direction opposite to the direction of movement of the conveyer to cause a single layer of pieces of food product aligned by the first backstop to discharge from the conveyor;
oscillating a divider in the chute between a first position and a second position, wherein in the first position, the pieces of food product slide down the divider and onto a first portion of the conveyor, and in the second position, the pieces of food product slide down the divider and onto a second position of the conveyor; and aligning the pieces of food product received at the second position of the conveyor into a single row with a plate of a second backstop positioned at least partially above the conveyor to receive the pieces of food product as they are received at the second position of the conveyor, wherein the plate of the second backstop extends in a direction parallel to the direction of movement of the conveyor;

wherein the paddle wheel further causes a single layer of pieces of food aligned by the second backstop to discharge from the conveyor.

16. A device comprising:

a conveyor;

a chute configured to receive and hold pieces of a food product, the chute comprising a divider configured to oscillate between a first position and a second position, wherein in the first position, the divider is configured to release pieces of food product at a first position of the conveyor, and in the second position, the divider is configured to release pieces of food product at a second position of the conveyor. a first backstop positioned partially above the conveyor, the first backstop comprising a plate that extends in a direction parallel to a direction of movement of the conveyor, wherein the plate of the first backstop is configured to align pieces of food product into a first single row that are received from the chute at the first position of the conveyor;

a second backstop positioned partially above the conveyor, the second backstop comprising a plate that extends in the direction parallel to the direction of movement of the conveyor, wherein the plate of the second backstop is configured to align pieces of food product into a second single row that are received from the chute at the second position of the conveyor; and a paddle wheel positioned above the conveyor downstream from the first backstop and the second backstop, wherein the paddle wheel is configured to manipulate the first single row of pieces of food product to cause a single layer of pieces of food product of the first row to discharge from the conveyer and to manipulate the second single row of pieces of food product to cause a single layer of pieces of food product of the second row to discharge from the conveyor;

a sensor configured to monitor a level of pieces of food product in the chute and to transmit a backup signal upon a determination that the level of pieces of food product in the chute exceeds a threshold; and a controller in communication with the sensor, wherein in response to receipt of the backup signal from the sensor, the controller is configured to at least one of:
increase a speed of the conveyor;
retract the plate of the first backstop;
retract the plate of the second backstop; or
raise a position of the paddle wheel above the conveyor.

* * * * *